Dec. 24, 1963  M. E. GINAVEN  3,115,087
CAGE ASSEMBLY
Filed April 17, 1962

INVENTOR.
MARVIN E. GINAVEN
BY Tom Walker
ATTORNEY

United States Patent Office 3,115,087
Patented Dec. 24, 1963

3,115,087
CAGE ASSEMBLY
Marvin E. Ginaven, Springfield, Ohio, assignor to The Bauer Bros. Co., Springfield, Ohio, a corporation of Ohio
Filed Apr. 17, 1962, Ser. No. 188,171
11 Claims. (Cl. 100—129)

This invention relates to cage assemblies in screw presses and the like wherein spaced screen bars define a longitudinally slotted wall through which expressed fluids and liquids may drain from the press.

The object of the invention is to simplify the construction as well as the means and mode of operation of cage assemblies, whereby such assemblies may not only be economically manufactured but will be more efficient and satisfactory in use, adaptable to a wide variety of application, and be unlikely to get out of order.

An object of the invention is to present a cage assembly as described in which a new organization of screen bars, spacer means and supports combines advantages of spacer retention with simplified assembly.

Another object of the invention is to provide for secure mounting of screen bar spacers in a manner to obviate their loosening and falling from the cage assembly.

A further object of the invention is to provide for mounting of the screen bar spacers as described through means which is self-locking in conjunction with assembly of the cage parts.

A further object of the invention is to provide a cage assembly possessing the advantageous structural features, the inherent meritorius characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view in perspective of a section of a cage assembly of a screw press in accordance with the illustrated embodiment of the invention;

Like parts are indicated by similar characters of reference throughout the several views.

Figure 1:
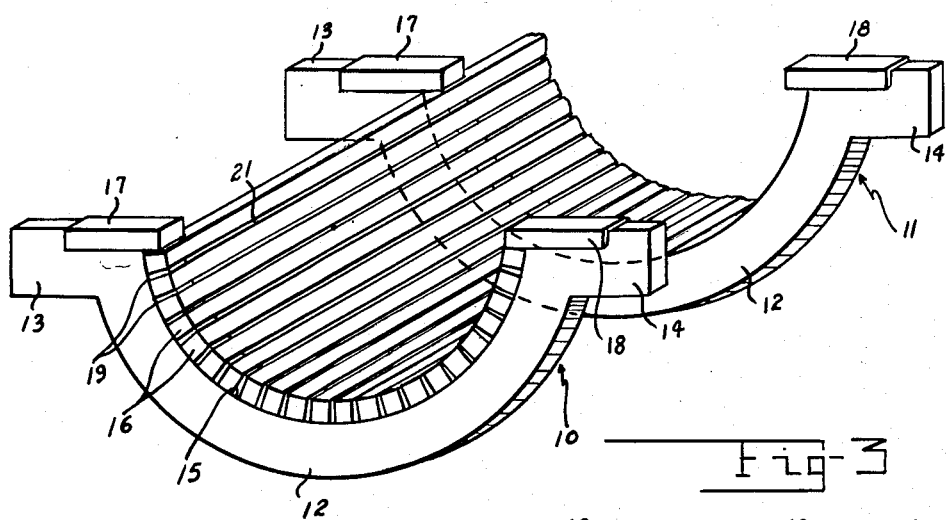
Figure 3:
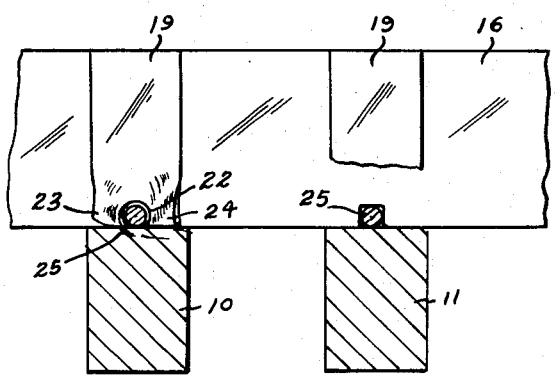
FIG. 3 is a detail view in longitudinal section, taken substantially along the line 3—3 of FIG. 2.
Figure 2:
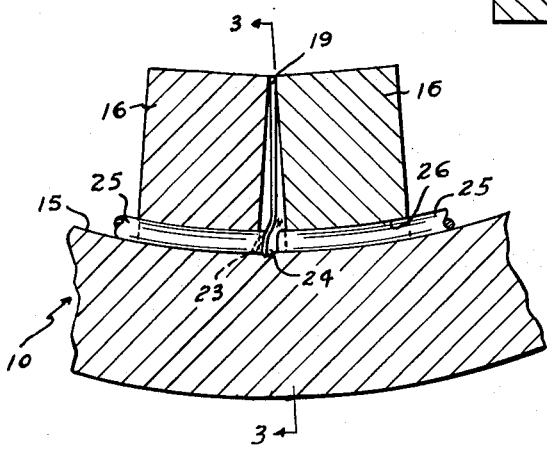
FIG. 2 is a fragmentary, detail view in cross-section of the cage assembly of FIG. 1, the section being taken through the assembled screen bars and spacer means at the location of one of the screen bar supports.

Referring to the drawing, a cage assembly in accordance with the illustrated embodiment of the invention comprises spaced apart rib supports 10 and 11, each having an arcuate mid-section 12 and oppositely projecting ears or flanges 13 and 14 at its ends. The rib supports 10 and 11 are aligned with one another and present at their mid-sections concave surfaces 15 affording direct support to screen bars 16. The support ribs are in underlying transverse relation to the screen bars 16, the latter being assembled in a parallel relation to one another and extending in a longitudinal sense throughout a predetermined section of the press wall. The assembly of screen bars extends in a transverse sense throughout concave surface 15, the arcuate ends of the assembly being defined by clamp bars 17 and 18 recessed into respective support flanges 13 and 14 and suitably secured thereto.

While the screen bars 16 might be made tubular, round in cross-section, or otherwise formed, they are in the illustrated instance solid bars rectangular in cross-section providing a strong press wall and achieving extensive contact with the surface 15 of the support ribs and with the clamp bars 17 and 18. Interposed between adjacent screen bars, at the location of each rib support 10 and 11, are spacer elements 19. Arranged in alternating relation to the screen bars 16, the spacer elements 19 define slots 21 of longitudinal extent between adjacent screen bars in a manner to provide for a free escape of expressed fluids and solids which may be released within the wall section defined by the cage assembly.

The spacer elements 19 are identical. Each is a part of generally rectangular configuration, made flat to a thickness corresponding to the desired width of the slots 21. At one end thereof each spacer element 19 is pierced by a hole 22 which opens through the said one end of the spacer element. On opposite sides of the hole 22 the spacer element is twisted in opposite directions in a manner to form fingers 23 and 24, the spacer element being made of a material to cause the fingers 23 and 24 to act as springs, resisting straightening and tending to resume the twisted position given to them in manufacture. The hole 22 is circular in configuration and is adapted to receive a wire or rod 25 of approximately corresponding diameter. Similarly, each screen bar 16 is formed with a transverse groove or notch 26 also adapted to receive the wire or rod 25.

A wire or rod 25 is provided for each rib support 10 and 11 and is disposed over mid-section 12 thereof to rest on surface 15 and conform to the curvature thereof. The notches 26 in the screen bars 16 are located to be aligned with one another and to coincide with the location of the wire 25. Thus installation of the screen bars in a transverse series as shown finds each of the bars interengaged with a wire 25 at the location of the rib supports 10 and 11.

Figure 4:
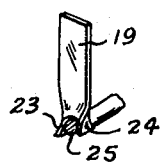
FIG. 4 is a detail view showing the cooperative relation achieved between a spacer member and mounting wire in an initial step of assembly of the cage.

The piercing of the hole 22 at one end of each spacer element 19 is so predetermined as to location that the exit opening therefrom through the extremity of the spacer is less than the diameter of the wire 25, considering the fingers 23 and 24 to lie in a plane common to one another and to the body of the spacer element. However, the twist imparted to the fingers 23 and 24 in the manufacture of the spacer spreads apart the adjacent points of the fingers in a manner to separate these points in a fore and aft direction a distance approximately equal to the diameter of the wire. Accordingly, to cocking or turning the spacer bodily from a position normal to the axis of wire 25 to an angled position, as on the order of 45°, the spacer may be slipped over the wire, substantially in the manner indicated in FIG. 4. Now, if the spacer is returned to a position normal to the wire the adjacent points of the fingers 23 and 24 underlie the wire and the spacer and wire accordingly are interlocked. Clamping of the spacer between adjacent screen bars tends to deflect and to stress the twisted fingers 23 and 24 back more nearly into the plane of the body of the spacer. A reactant pressure against the clamping screen bars accordingly is produced, and, at the same time, the points or prongs on the fingers 23 and 24 are caused more closely to surround the wire 25.

According to one convenient method of assembly, the cage wires are laid on the rib supports as described. Then, in conjunction with one another, as in alternating order, the screen bars 16 and spacer elements 19 are mounted on the supports and interengaged with the wires 25. The spacers 19 are installed, as described, by being engaged with the wires while in a cocked position. Now, as clamping pressure is applied to the ends of the screen bar assembly, as through the clamping bars 17 and 18, adjacent bars are caused to approach one another. In the course of such movement the spacer elements are straightened to assume a position more nearly normal to the longitudinal axis of wire 25, and, in response to application of the final clamping pressure the fingers 23 and 24 are stressed and the entire cage assembly made substantially rigid and secure. Elements 19 limit the approaching motion of the screen bars and so define the slots 21. The spacer elements serve also to maintain the screen bars stressed to an assembled condition and at the same time provide a frictional force inhibiting loosening of the spacers. Also, and by reasons of the interlocking engagement achieved between fingers 23 and 24 and the wire 25, the spacer elements are positively prevented from falling from the cage assembly.

It will be understood that the cage assembly shown in FIG. 1 is a section of a press which may further include a corresponding overlying section defining with the one illustrated a substantially cylindrical press barrel. Two series of spacer elements are shown in the illustrative example, the invention comprehending a use of one or more such series.

Also the function of wire 25 might be performed by a bead or like formation on the rib 10 or 11 and the wire is in this sense considered to be a part on the screen bar supports. The use of a separable wire as shown provides a simplified means of adapting the invention to existing press support members as well as obviating machining costs. The spacer elements may conveniently be made of spring steel or the like whereby the fingers 23 and 24 thereof will readily assume and tend resiliently to maintain the twisted configuration illustrated and described.

From the above description is will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a press or the like, a cage assembly including a plurality of parallel screen bars, spacers between adjacent bars, the assembly comprising said bars and spacers being adapted to be clamped in a contacting unitary relation, each of said spacers at one end being recessed and having the material on opposite sides of the formed recess spread to define spring fingers stressed for energizing by compression of adjacent bars, supporting means for said bars, and means on said last named means in common interengagement with the recesses in said spacers.

2. A press or the like according to claim 1, characterized in that said recess is circular, said fingers moving under compression to achieve an interlocking engagement with the said interengaging means on said supporting means.

3. In a press or the like, a cage assembly including a plurality of parallel screen bars, a pair of adjacent bars having aligned transverse notches on their undersides, a spacer member between said pair of adjacent bars, said member being a flat part having in one end thereof a recess adapted to register with said notches, the material of said spacer on either side of said recess being twisted in opposite directions to define spring fingers, said fingers being stressed by clamping pressure, a support for said screen bars, and means on said support received in the aligned notches in said bars and in the recess of said spacer member establishing an interconnected relation therebetween.

4. A press or the like according to claim 3, characterized in that said recess and said last named means have complementary outline configurations, the said spring fingers on said spacer normally being spread to admit said means to said recess and when stressed achieving a locking engagement with said means.

5. In a press or the like, a cage assembly including a plurality of parallel screen bars a pair of adjacent bars having aligned transverse notches on their underside, a spacer member between said pair of adjacent bars, said member being a flat part having in one end thereof a recess adapted to register with said notches, the material of said spacer on either side of said recess being twisted in opposite directions to define spring fingers, said fingers being stressed by clamping pressure applied through the adjacent bars to generate reactant pressure, a support for said screen bars, and a wire round in cross-section overlying said support in transverse underlying relation to said screen bars, said wire being received in the aligned notches of said bars and in the recess in said spacer member, said recess being circular in outline to conform to the cross-section shape of said wire in the stressed position of said spring fingers to lock said spacer member to said wire.

6. In a press or the like, a cage assembly, including longitudinally extending parallel screen bars, a support for said bars, a transversely extending wire on said support underlying said bars, said bars having aligned notches on their undersides receiving said wire, and spacer elements installed between adjacent screen bars, said element being flat and having at one end a pierced hole opening through said one end, projecting portions alongside said hole being twisted in opposite directions to define spring fingers, each of said elements being turned at an angle from a position normal to said wire to receive said wire in said hole, said elements being returned to a position normal to said wire by clamping pressure applied through said screen bars and said spring fingers being stressed thereby, the said pierced hole conforming approximately to the cross-sectional shape of said wire, the stressing of said spring fingers locking said spacer elements to said wire.

7. A press or the like according to claim 6, characterized by means for clamping said screen bars and spacer elements into a unitary assembly, said means applying a clamping pressure as described to adjust said spacer elements and stress the spring fingers thereof.

8. A press or the like according to claim 6, characterized by a plurality of longitudinally spaced apart supports, each of said supports having a transverse wire as described and spacer elements as described being installed in the assembled screen bars at the location of respective supports.

9. In a press or the like, a cage assembly including arcuate rib means, a plurality of parallel screen bars extending in transverse relation to said rib means, spacers between said bars at the locations of said rib means, anchor means nested in said screen bars and on said rib means, said spacers being formed to slip fit to said anchor means and including resilient portions interlocking therewith in response to a clamped confinement thereof between adjacent screen bars.

10. In a press or the like, a plurality of parallel screen bars, spacers between said bars at locations spaced longitudinally thereof to define slots therebetween, outermost surface portions of said bars having aligned slots in transverse alignment with said spacers, wire-like means confined in said aligned slots extending in transverse relation to said bars, said spacers having a slip fit to said wire-like means and including resilient portions interlocking therewith in response to a clamped confinement thereof between adjacent screen bars.

11. In a press or the like, a cage assembly including support means, a plurality of parallel screen bars extending in transverse relation to said support means, spacers between said bars, means nested in said bars having a slip fit relation to said spacers and said spacers having resilient portions interlocking with said means nested in said bars in response to clamping thereof between adjacent bars.

References Cited in the file of this patent
UNITED STATES PATENTS

| | | |
|---|---|---|
| 1,321,351 | Anderson | Nov. 11, 1919 |
| 2,118,992 | Upton | May 31, 1938 |